March 26, 1957 C. J. BORROW 2,786,509
PAN FORMING APPARATUS
Filed Nov. 25, 1953 2 Sheets-Sheet 1
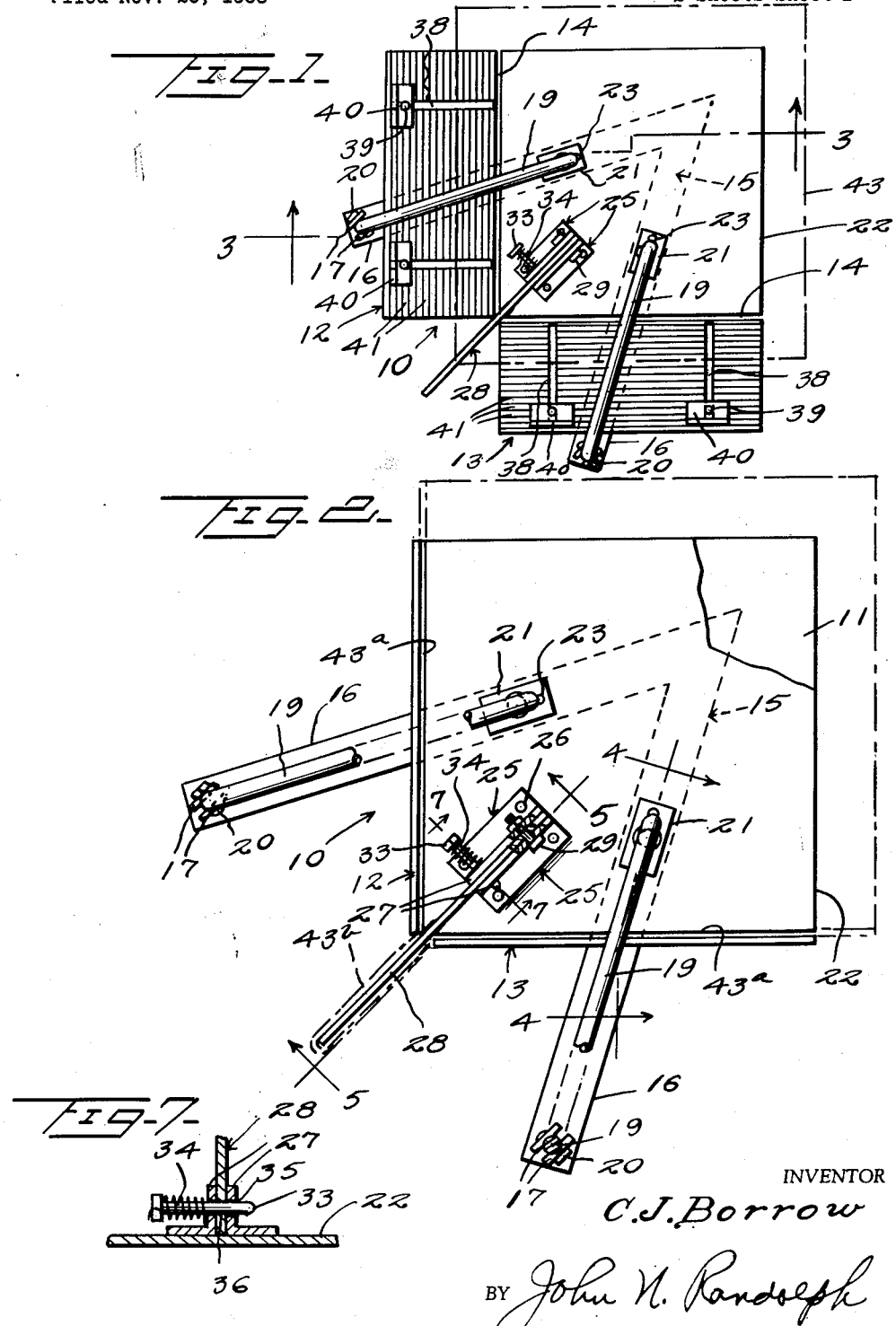
INVENTOR
C. J. Borrow
BY John N. Randolph
ATTORNEY

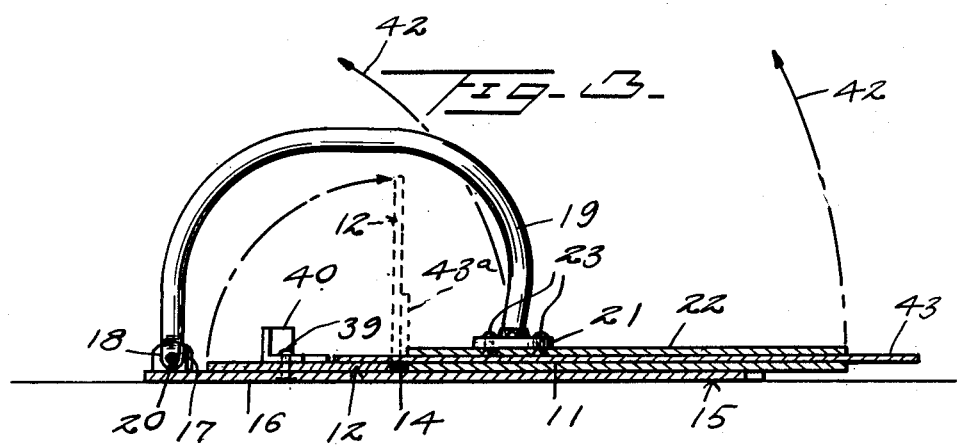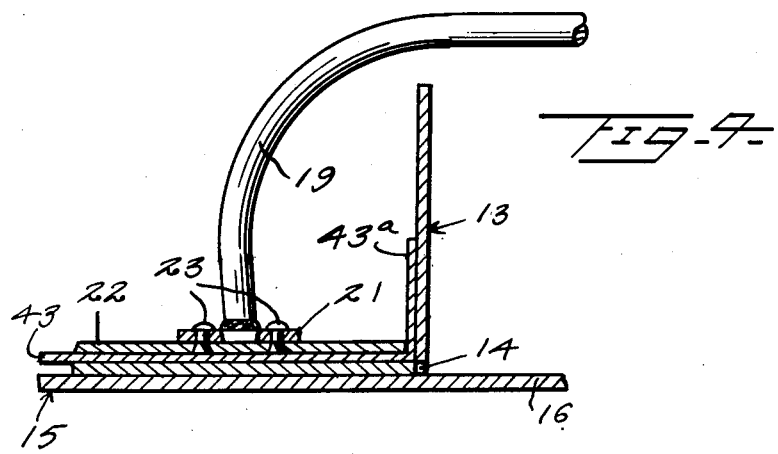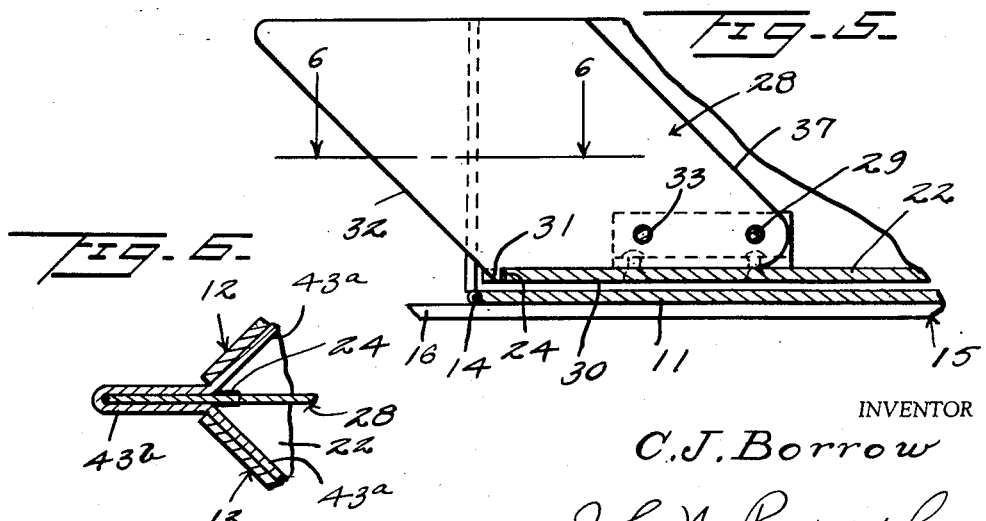

United States Patent Office 2,786,509
Patented Mar. 26, 1957

2,786,509

PAN FORMING APPARATUS

Charles J. Borrow, Carmichael, Calif.

Application November 25, 1953, Serial No. 394,337

6 Claims. (Cl. 153—17)

This invention relates to a portable apparatus of extremely simple construction which may be carried by a workman to the location of a job and utilized for forming shower pans or similar articles.

More particularly, it is an aim of the present invention to provide an apparatus capable of accurately forming corner folds in sheets of metal and other materials.

Various other objects and advantages of the invention will hereinafter become more fully apparent from the following description of the drawings, illustrating a presently preferred embodiment thereof, and wherein:

Figure 1 is a top plan view of the pan forming apparatus with the flaps or leaves thereof in extended positions;

Figure 2 is an enlarged plan view showing the flaps or leaves raised for folding two edge portions of a sheet of material;

Figure 3 is an enlarged vertical sectional view taken substantially along a plane as indicated by the line 3—3 of Figure 1;

Figure 4 is an enlarged fragmentary vertical sectional view taken substantially along a plane as indicated by the line 4—4 of Figure 2;

Figure 5 is an enlarged fragmentary vertical sectional view taken substantially along a plane as indicated by the line 5—5 of Figure 2;

Figure 6 is a fragmentary horizontal sectional view taken substantially along a plane as indicated by the line 6—6 of Figure 5, and Figure 7 is an enlarged fragmentary cross sectional view taken substantially along a plane as indicated by the line 7—7 of Figure 2.

Referring more specifically to the drawings, the pan forming apparatus in its entirety and comprising the invention is designated generally 10 and includes a substantially square bottom plate 11 having flaps or leaves 12 and 13 connected by hinges 14 to two adjacent edges of said bottom plate 11. The hinges 14 preferably extend from end-to-end of the flaps or leaves and of the edges of the plate 11 to which said hinges are secured.

A substantially V-shaped bar 15 is suitably secured to the underside of the bottom plate 11 and has complementary bar ends 16 extending from beneath the edges thereof to which the hinges 14 are secured outwardly to beyond the outer free edges of the flaps or leaves 12 and 13. Said flaps or leaves are normally supported on the bar ends 16, as illustrated in Figures 1 and 3.

A pair of upstanding ears 17 are fixed to and rise from each bar end 16 remote to the plate 11 and outwardly with respect to the outer edges of the leaves 12 and 13, as seen in Figures 1 and 3. The ears of each pair of ears 17 are spaced to receive therebetween a flattened end 18 of an arch shaped rod 19. A pivot pin 20 extends through each pair of ears 17 and loosely through the rod end 18 disposed therebetween for swingably connecting the rods 19 to the outer portions of the bar ends 16. A flat bar forming a head 21 is secured to the opposite end of each rod 19, in any suitable manner, and said heads 21 are disposed flush against one side of a top plate 22 and are suitably secured thereto as by means of rivets 23. The top plate 22 is preferably of the same size and shape as the bottom plate 11 and is so connected to the heads 21 as to be disposed in a centered position over the bottom plate 11 when the rods 19 are disposed as illustrated in the drawings.

A notch 24 is formed in and opens outwardly of the corner of the top plate 22 which is located between the adjacent ends of the flaps or leaves 12 and 13. A pair of angle members 25 are secured by fastenings 26 to the upper side of the top plate 22 and have upstanding adjacently disposed walls or flanges 27 defining a channel therebetween which is disposed in alignment with said notch 24. A blade or fin 28, as best illustrated in Figure 5, which is preferably of substantially the shape of a parallelogram, has a portion thereof loosely disposed between the upstanding flanges or walls 27. A bolt or pin 29 extends through said walls 27, remote from the notch 24 and through the blade or fin 28, near one end thereof, for swingably connecting the blade or fin to the top plate 22. The pivot pin 29 is so disposed relatively to the blade 28, that in one position of said blade as illustrated in Figure 5, the bottom edge 30 thereof rests flush against the upper surface of the top plate 22. The blade 28, remote from the pivot 29, is provided with an integral depending projection 31, which extends downwardly from said bottom edge 30 and which fits into the notch 24, when the edge 30 is resting on the plate 22. The blade or fin 28 has an outer edge 32 which is inclined upwardly and outwardly from the projection 31 and from the outer end of said bottom edge 30.

A latching pin 33 is urged by a pull spring 34 through aligned openings 35 of the walls 27, which are located adjacent to the notch 24. The pin 33 extends through an opening 36 of the blade 28, to latch said blade in its position of Figure 5. It will be readily obvious that the latch pin 33 may be retracted out of engagement with the blade opening 36 to allow the blade or fin 28 to be swung clockwise from its operative position of Figure 5 to an inoperative position wherein a back edge 37 of said blade will rest on the top plate 22.

The leaves or flaps 12 and 13 are each provided with two transversely disposed slots 38 which extend toward and away from the adjacent edges of the top plate 22, in each of which is slidably mounted a clamping fastening 39 which is connected to a gauge member 40. The gauge members 40 are disposed on the upper sides of the leaves 12 and 13 and are slidably movable with the clamping fastening 39 toward and away from the plate 22 and are secured by said clamping fastenings in different adjusted positions at desired distances from the adjacent edges of the top plate 22. The upper surfaces of the leaves or flaps 12 and 13 are also provided with longitudinally extending lines 41 which are preferably spaced one-half inch apart to form a linear scale on the upper surface of each leaf.

From the foregoing it will be readily apparent that the apparatus 10 constitutes a portable device which may be readily carried onto a job and as it is intended primarily for making shower pans, it will be described in conjunction with this use. However, it is to be understood that the apparatus 10 is likewise well adapted for forming other receptacles. In the use of the apparatus, the rods 19 carrying the top plate 22 are swung upwardly from their positions as illustrated in the drawings in the directions as indicated by the arrows 42 in Figure 3, so that a sheet of material 43 may be placed on the bottom plate 11. Two edges of the sheet 43 overlie portions of the leaves or flaps 12 and 13, which are disposed coplanar with the bottom plate 11 and either the gauge elements 40 or the scale lines 41 are employed for properly centering the material 43 relatively to the bottom plate 11 and so that the four edges of the material 43 will be spaced outwardly equal distances from the four adjacent edges of the bottom plate. The rods 19 carrying the top plate 22 are then swung back toward their positions as illustrated in the drawings and so that the top plate 22 will rest on the material 43 for clamping the material between the plates 11 and 22. The blade or fin 28 may be in its latched position as illustrated in the drawings during these movements of the top plate 22. With the top plate 22 held firmly on the material 43, the leaves or flaps 12 and 13 are swung upwardly and inwardly from their horizontal positions of Figure 1 to their upright or vertical positions of Figures 2 and 4, causing the two side edge portions of the material 43 which are resting on the leaves 12 and 13 to be bent upwardly to form two pan sides 43a, as seen in Figures 2, 4 and 6. This upward bending of the material to form the pan sides 43a will also cause the corner of the material which is disposed beneath the inclined outer edge 32 of the blade 28 to be folded by said edge to provide a two ply fold 43b which straddles the outer portion of the blade 28, as best illustrated in Figures 2 and 6. The latch pin 33 may then be retracted to permit the blade or fin 28 to be swung counterclockwise as seen in Figure 5 about its pivot 29 and out of engagement with the fold 43b. The leaves 12 and 13 may then be returned to their horizontal positions of Figure 1, after which the fold 43b may be bent over against the outer side of one of the pan sides 43a and secured thereto in any suitable manner as by welding, if the material 43 constitutes a metal. It will be apparent that the rods 19 are arched sufficiently so that the leaves 12 and 13 may be swung upwardly therebeneath, as illustrated in the drawings.

Thereafter, the rods 19 and plate 22 are swung upwardly as previously described to re-position the material 43 by turning it through an arc of 90°, preparatory to repeating the operation, until the four pan sides 43a and the four corner folds 43b have been formed. If desired, the corner folds 43b may be bent over and secured after formation of all of the corner folds and pan sides have been completed.

Various modifications and changes are contemplated and may obviously be resorted to, without departing from the spirit or scope of the invention as hereinafter defined by the appended claims.

I claim as my invention:

1. An apparatus of the character described comprising a bottom plate having two side edges forming a right angle, leaves hingedly connected to said side edges and extending the length thereof, a top plate, means swingably connecting said top plate and bottom plate at points spaced outwardly from said leaves for swinging movement of the top plate toward and away from the bottom plate and for positioning the top plate with two right angularly disposed edges thereof directly above said aforementioned right angularly disposed edges of the bottom plate, said plates forming a clamp between which a sheet of material is adapted to be detachably clamped with edge portions thereof overlying corresponding portions of said leaves, when the leaves are disposed substantially coplanar with said bottom plate, and a blade secured to the upper side of said top plate and having an upwardly inclined bottom edge extending outwardly and upwardly from the corner of the top plate located between said leaves, said leaves being swingable upwardly for bending the sheet portions disposed thereon upwardly to form two pan sides and for folding the corner of the sheet located between said pan sides around said bottom edge of the blade.

2. An apparatus as in claim 1, said means swingably connecting the plates including bar ends secured to the underside of the bottom plate and extending outwardly therefrom to beyond the outer edges of the leaves, arch shaped members having complementary ends swingably connected to the outer portions of said bar ends and having inner ends secured to spaced portions of the upper side of said top plate, said leaves being swingable upwardly to positions perpendicular to the plates and beneath said arch members.

3. An apparatus as in claim 1, and means supporting said blade in a plane perpendicular to the plane of said top plate.

4. An apparatus as in claim 3, said means including a pivot for swingably mounting said blade relatively to the top plate for swinging movement inwardly and away from said top plate corner to an inoperative position, and a latch forming a part of said supporting means for releasably latching the blade in an operative position with said inclined edge portion thereof extending outwardly and upwardly from the corner of the top plate located adjacent the adjacent ends of said leaves.

5. An apparatus as in claim 4, said top plate corner having an outwardly opening notch, and said blade having a bottom edge portion resting on the top surface of the top plate, when the blade is in an operative position, and provided with a depending projection fitting into said notch.

6. An apparatus of the character described comprising a bottom clamping plate and a top clamping plate, means swingably connecting said plates for locating right angularly disposed side edges of the plates in registering positions, a pair of leaves hingedly connected to and extending outwardly from the right angularly disposed edges of the bottom plate and on which edge portions of a sheet of material clamped between said plates are disposed, and a blade member secured to the top plate and having an upwardly and outwardly inclined bottom edge extending outwardly and upwardly from the right angularly disposed corner of said top plate and between said leaves, said leaves being swingable upwardly to upright positions for bending the portions of the material disposed thereon upwardly to form two pan sides, the corner of the material located beneath said blade edge being folded therearound by the upward swinging movement of the leaves to form a corner fold in the material between said pan sides.

References Cited in the file of this patent

UNITED STATES PATENTS

| | | |
|---|---|---|
| 57,261 | Sager | Aug. 14, 1866 |
| 79,438 | Best | Aug. 14, 1868 |
| 145,660 | Kuessner | Dec. 16, 1873 |
| 271,388 | Williams et al. | Jan. 30, 1883 |